United States Patent [19]

Molaug

[11] Patent Number: 4,598,601

[45] Date of Patent: Jul. 8, 1986

[54] MEANS FOR COUNTERBALANCING MASS IN MECHANISMS SUCH AS A ROBOT ARM

[76] Inventor: Ole Molaug, Jernbanegaten 4, N-4340 Byrne, Norway

[21] Appl. No.: 532,538

[22] Filed: Sep. 15, 1983

[30] Foreign Application Priority Data

Sep. 17, 1982 [NO] Norway .................................. 823150

[51] Int. Cl.⁴ .............................................. G05G 1/00
[52] U.S. Cl. ...................................... 74/469; 248/648; 248/665; 901/48
[58] Field of Search ........................... 74/469; 16/1 C; 248/648, 292.1, 665, 575; 901/48; 414/730

[56] References Cited

U.S. PATENT DOCUMENTS

| | | | |
|---|---|---|---|
| 1,090,697 | 3/1914 | Eddelman | 16/1 C |
| 1,155,846 | 10/1915 | Strong | 74/469 |
| 2,547,532 | 4/1951 | Mendelsohn | 248/292.1 |
| 2,605,494 | 8/1952 | Lyons, Jr. et al. | 16/1 C |
| 2,726,669 | 12/1955 | Reilley | 74/469 X |
| 2,758,479 | 8/1956 | Landwier | 74/469 X |
| 3,897,636 | 7/1975 | Nystrom | 248/575 X |
| 4,165,121 | 8/1979 | Hori et al. | 16/1 C X |
| 4,277,044 | 7/1981 | Hamilton | 248/292.1 X |

*Primary Examiner*—William E. Tapolcai
*Attorney, Agent, or Firm*—Paul L. Sjoquist

[57] ABSTRACT

A means for counterbalancing a mass (9) in mechanisms such as a robot arm (1), wherein the robot arm (1) has a fixed support point (2) and is attached to one end of a spring (3) for counterbalancing arm loading. The other, remote point of attachment (6) for the spring (3) is movable in relation to the fixed support point (2) for the arm (1), so that the distance between said remote point of attachment (6) for the spring (3) and the fixed support point (2) for the robot arm (1) can be varied for altering the geometry of the system, according to the weight of the mass, the tool (9), attached to the end of the robot arm (1), whereby the robot arm (1) can be counterbalanced in all positions and can be adjusted to different masses without reducing the dynamic properties of the robot arm (1).

2 Claims, 1 Drawing Figure

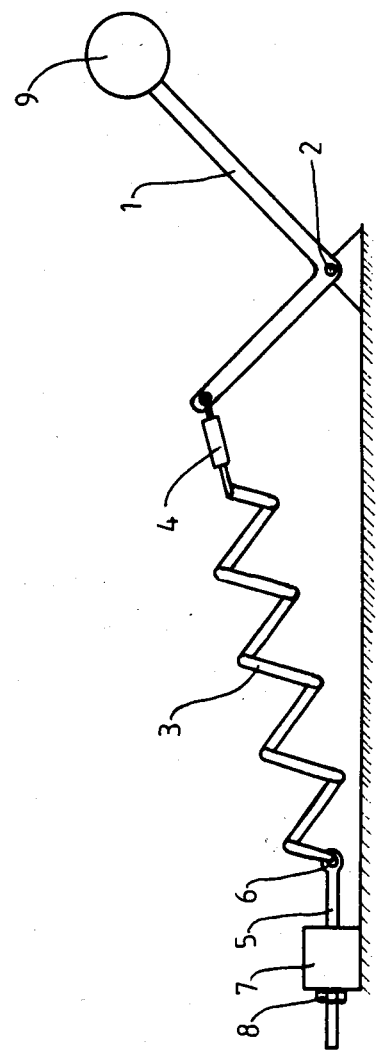

MEANS FOR COUNTERBALANCING MASS IN MECHANISMS SUCH AS A ROBOT ARM

The present invention relates to a means for counterbalancing mass in mechanisms such as a robot arm. A robot arm must be able to counterbalance different loads, for example, various types of tools mounted on the robot arm. For effective operation, a counterbalancing means must be cpable of holding the robot arm stable in all positions and must be easily adaptable to different loads on the arm without reducing the arm's dynamic properties.

One well known method of providing counterbalance is the use of a counterweight. A counterweight satisfies the requirements mentioned above, with one exception: It does substantially reduce the arm's dynamic properties. A more common method of providing a counterbalancing force, therefore, is the use of one or more springs. It is possible to compensate for changes in arm loading by adjusting the tension of the spring; however, owing to the geometry of the system, the arm will be correctly counterbalanced at only one position of the arm. The geometry of the system is constant, since the distance between the fixed support point for the robot arm and the point of attachment of the spring at the end opposite its attachment to the robot arm is constant, so that compensating for a change in mass over the entire area requires altering the spring constant. This fixed distance is characteristic for the known systems of this type. The spring constant is dependent upon the spring's construction, and to change the spring constant would therefore require altering the spring itself. In the case of a helical spring, for example, this would mean changing the wire diameter, the spring diameter, the number of turns.

At only slight changes in the arm loading, it is usually considered acceptable that the robot arm is out of balance in the extreme outer position, but if the load is increased, the spring has to be replaced to obtain proper counterbalance.

The object of the invention is to provide a means for counterbalancing mass in mechanisms such as a robot arm whereby the robot arm can be brought into balance over the entire work area by means of a simple adjustment when the load on the arm is changed, and wherein the counterbalancing means does not reduce the dynamic properties of the robot arm.

This object is obtained in accordance with the invention by means of the features recited in the appurtenant patent claims.

An exemplary embodiment of the invention is shown in the accomanying schematic drawing of a robot arm.

The illustration shows an L-shaped robot arm 1 which is pivotally supported at a fixed support point 2. One end of a helical spring 3 is fastened by means of a spring tensioning means 4 to the short leg of the L-shaped arm 1. The other end of the helical spring 3 is fastened to the eye 6 of an eye bolt 5. The eye bolt 5 is longitudinally movable in a fixed bearing 7 which provides its support. The fixed support point 2 of the robot arm 1 is located on an extension of the centerline of the eye bolt 5. The eye bolt 5 is provided with a nut 8, and by screwing the nut into different positions along the shaft of the eye bolt 5, the eye bolt 5 is made to move axially in the fixed bearing 7. Thus, the distance between the eye 6 of the eye bolt 5 and the fixed support point 2 of the robot arm 1 can be varied to change the geometry of the system, according to the weight of the tool 9 attached to the robot arm 1. In this simple manner, the robot arm 1 can be counterbalanced in all arm positions and can easily be adjusted to different loads 9 without reducing the dynamic properties of the arm 1.

Moving the eye bolt 5 alters the tension of the helical spring 3 and simultaneously moves the line of attack of the spring force, so that the robot arm 1 and the mass, the tool 9, remain in balance over the entire work area of the robot arm 1, even if the mass is changed. This is the case because the geometry of the system as well as the tension of the spring 3 are altered by this adjustment. The novel principle of the invention, in other words, resides in the fact that by altering the geometry of the system it is possible to adapt the same spring constant to different loads.

I claim:

1. A means for counterbalancing the weight of a tool and the weight of mass in mechanisms such as a robot arm (1), wherein the robot arm (1) has a fixed support point (2) and is attached to a spring (3) for counterbalancing a load on the arm, said spring (3) being fastened to the arm via a spring tensioning means (4), characterized in that the point of attachment (6) for the other end of the spring (3), remote from the arm (1), is arranged along a first straight line through the fixed support point (2) for the arm (1) and the spring (3) is aligned along a second straight line different from said first straight line, through the point of attachment (6) to the robot arm (1), and including means for moving the point of attachment (6) along the first straight line, so that the distance between said remote point of attachment (6) for the spring (3) and the fixed support point (2) for the robot arm (1) can be varied along the first straight line between the two points (6, 2) and simultaneously the direction of the second straight line can be varied between the point of attachment (6) and the robot arm (1) for altering the geometry of the system, according to the weight of the mass and the weight of the tool (9), attached to the robot arm (1), whereby the robot arm (1) is counterbalanced in all positions and can be adjusted to different weights without reducing the dynamic properties of the robot arm (1).

2. A counterbalancing means as recited in claim 1, characterized in that said remote end of the spring (3) is fastened to a body (5) that is longitudinally movable in a fixed bearing (7) supporting said body (5).

* * * * *